3,128,985
RESILIENT MOUNTING
Leon Wallerstein, Jr., Erie, Pa., assignor to Lord Manufacturing Company, Erie, Pa., a corporation of Pennsylvania
Filed Oct. 17, 1961, Ser. No. 145,603
4 Claims. (Cl. 248—358)

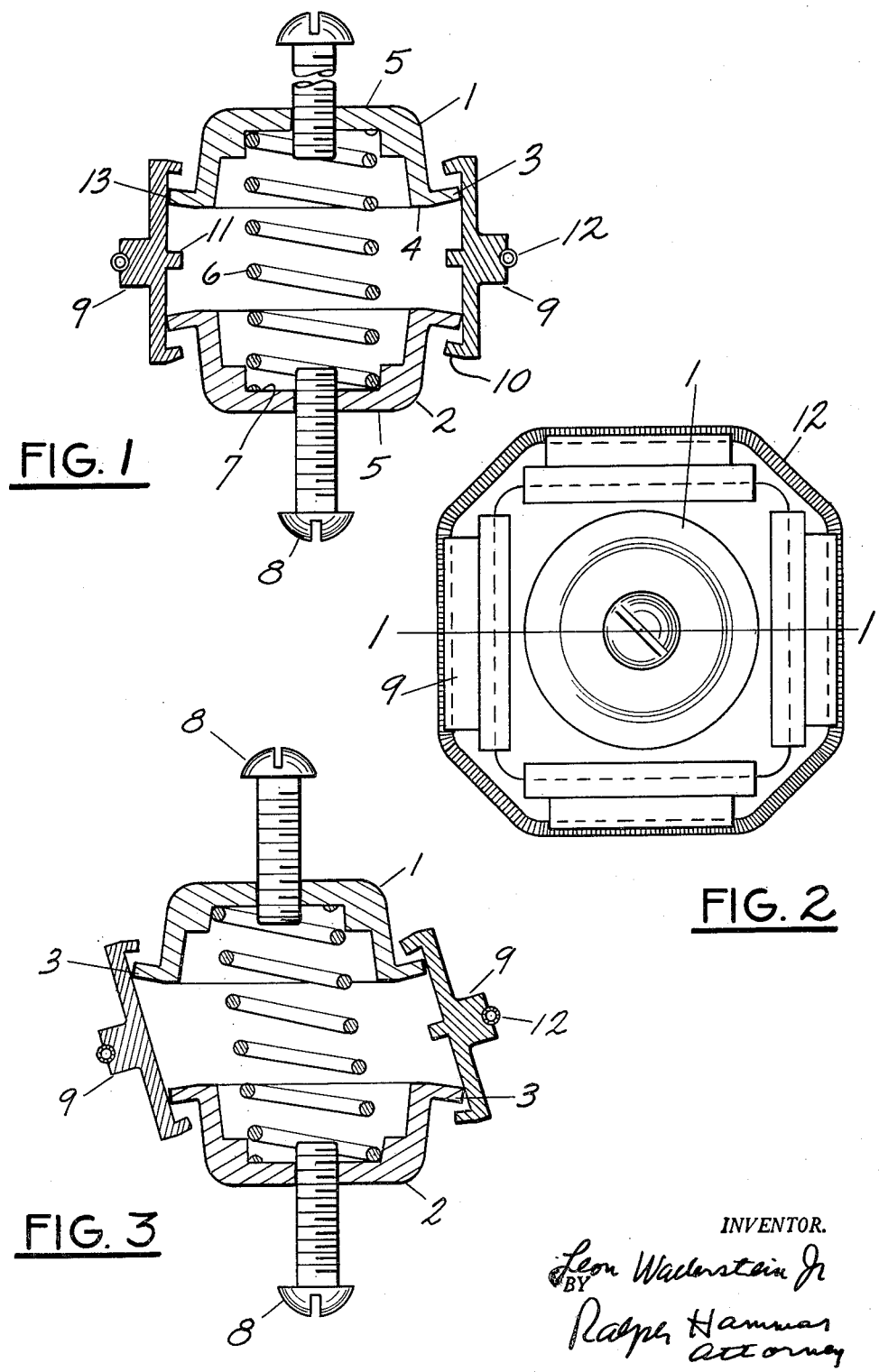

This invention is a resilient mounting in a preferred form of which friction damping is effected through floating shoes slidably and tiltably engaging the supporting and supported members of the mounting.

In the drawing, FIG. 1 is an elevation of a preferred form of the mounting in section of line 1—1 of FIG. 2, FIG. 2 is a plan view, and FIG. 3 is a view similar to FIG. 1 with the supporting and supported members laterally offset relative to each other.

The supporting and supported members 1 and 2 are conveniently made as identical cup shaped die castings with polygonal (e.g. triangular, square, etc.) flanges 3 projecting outwardly from the rim 4. The members are assembled with the rims 4 presented toward each other and with the bottom walls 5 remote from each other. The load is carried by a coil spring 6 having opposite ends suitably fixed in spring seats 7 respectively formed in the bottom walls 5 of the supporting and supported members. Load carrying connections to the supporting and supported members are made through screws 8 in the bottom walls 5. Because the ends of the spring 6 are fixed in the spring seats, the spring will accommodate loads in all directions.

At each flange 3 is a shoe 9 having inwardly extending flanges 10 at the upper and lower edges which project over the flange. Preferably, the inter engaging surfaces of the flanges 10 and 3 are inclined so as to provide hooking engagement when the flanges come into contact. This positively limits the maximum separation of the flanges 3. At the center of each of the shoes 9 is an inwardly extending rib or projection 11 which limits the excursion of the flanges 3 relative to the shoes. The shoes 9 are held resiliently against the adjacent sides of the flanges 3 for example by a garter spring 12. This maintains the shoes in friction contact with the edges of the flange 3 under all conditions. The contacting edges of the flange 3 may be provided with coatings 13 of friction material or there may be metal-to-metal contact.

Under vertical loads, there is a sliding engagement between the flange 3 and the shoes 9 which provides friction damping. The shoes 9 are free to float until contact is made between the flanges 3 on the members 1 and 2 and the flanges 10, 11 on the shoes. The shoes need not be centralized with respect to the flanges. This eliminates any alignment problem. Under relative lateral movement of the supporting and supported members, in a direction perpendicular to one of the sides of the flanges 3, there is a tilting movement of the shoes which are perpendicular to the direction of movement and a relative sliding movement between the shoes engaging the other sides of the flanges 3. Since all lateral movements may be resolved into components perpendicular to the sides of the flange 3, each component is damped. All directions of translation are accordingly subject to friction damping. For relative angular motions of the supporting and supported members, the flanges 3 rock about the axis of the angular movement, producing relative sliding between the flanges 3 and the shoes 9.

What is claimed as new is:

1. A resilient mounting comprising supporting and supported members and spring means connected in load carrying relation between said members, at least one of said members having a flange with polygonal sides, a plurality of shoes each frictionally engaging one of said sides, and means supporting said shoes for free tilting relative to the associated sides and for holding the shoes in contact with the associated sides.

2. A resilient mounting comprising cup shaped supporting and supported members with rims spaced from and presented toward each other and with bottom walls remote from each other, spring means seated on the bottom walls of the members and connecting the members in load carrying relation, said members having outwardly projecting flanges on the rims, a plurality of separate shoes spaced from each other and disposed about said flanges, each of said shoes having flanges projecting inwardly over the flanges on the supporting and supported members, the flanges on the shoes being spaced apart a distance greater than the spacing of the flanges on the supporting and supported members, and means for holding the shoes in contact with the flanges of said supporting and supported members.

3. A resilient mounting comprising supporting and supported members with outwardly projecting flanges presented toward and spaced from each other, spring means arranged in load carrying relation between said members, a plurality of shoes surrounding and slidably engaging the edges of said flanges, said shoes having projections straddling and spaced from said flanges, and a garter spring encircling the shoes and holding the shoes against the edges of the flanges.

4. A resilient mounting comprising supporting and supported members with outwardly projecting flanges presented toward and spaced from each other, spring means arranged in load carrying relation between said members, a plurality of shoes surrounding and slidably engaging the edges of said flanges, said shoes having projections straddling and spaced from said flanges, and spring means for holding the shoes against the edges of the flanges.

References Cited in the file of this patent

UNITED STATES PATENTS

| | | |
|---|---|---|
| Re. 22,980 | Donkersley | Mar. 9, 1948 |
| 2,616,685 | Dath | Nov. 4, 1952 |
| 2,687,269 | Titus | Aug. 24, 1954 |